(12) United States Patent
Kanno et al.

(10) Patent No.: US 7,571,032 B2
(45) Date of Patent: Aug. 4, 2009

(54) DISPLAY DEVICE FOR WATERCRAFT

(75) Inventors: Isao Kanno, Shizuoka (JP); Hitoshi Motose, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/240,690

(22) Filed: Sep. 30, 2005

(65) Prior Publication Data

US 2006/0020376 A1 Jan. 26, 2006

Related U.S. Application Data

(63) Continuation of application No. PCT/JP2004/015358, filed on Oct. 18, 2004.

(30) Foreign Application Priority Data

Jan. 6, 2004 (JP) .............................. 2004-000980

(51) Int. Cl.
*B60Q 1/00* (2006.01)
(52) U.S. Cl. ......................... 701/21; 715/771
(58) Field of Classification Search ................... 701/21, 701/29, 30; 340/984, 438, 459, 461, 462; 116/62.4; 715/771, 864, 970
See application file for complete search history.

(56) References Cited

U.S. PATENT DOCUMENTS

| | | |
|---|---|---|
| 3,641,965 A | 2/1972 | Schmiedel |
| 4,442,424 A | 4/1984 | Shirasaki |
| 4,464,933 A * | 8/1984 | Santis ....................... 73/866.3 |
| 4,523,457 A | 6/1985 | Bayer et al. |
| 4,611,193 A | 9/1986 | Bruggemann |
| 4,652,878 A | 3/1987 | Borgensen |
| 4,740,780 A | 4/1988 | Brown |
| 4,778,414 A | 10/1988 | Taguchi |
| 4,787,039 A * | 11/1988 | Murata ........................ 701/1 |
| 4,792,783 A * | 12/1988 | Burgess et al. ............. 307/10.1 |
| 4,855,733 A | 8/1989 | Koike |
| 4,931,025 A | 6/1990 | Torigai et al. |
| 4,988,996 A | 1/1991 | Ito |
| 5,017,916 A * | 5/1991 | Londt et al. ............ 340/870.13 |
| 5,094,637 A | 3/1992 | Nakamura |
| 5,118,315 A | 6/1992 | Funami et al. |

(Continued)

FOREIGN PATENT DOCUMENTS

DE  33 09 802 A1  9/1984

(Continued)

OTHER PUBLICATIONS

Search Report for PCT/JP2004/015358, mailed Jan. 25, 2005.

(Continued)

*Primary Examiner*—Dalena Tran
(74) *Attorney, Agent, or Firm*—Knobbe, Martens, Olson & Bear, LLP

(57) ABSTRACT

A display device for a watercraft indicates various status data values regarding the conditions of an outboard motor, such as cooling water temperature, battery voltage, and oil level. The display device has a dot matrix display as a part of display region, in which dots capable of being turned on and off are arranged in the form of a matrix, and the status data values are indicated via the lighting pattern of the dots.

32 Claims, 8 Drawing Sheets

U.S. PATENT DOCUMENTS

| | | | |
|---|---|---|---|
| 5,167,546 A | 12/1992 | Whipple | |
| 5,352,137 A | 10/1994 | Iwai et al. | |
| 5,367,297 A * | 11/1994 | Yokoyama | 340/984 |
| 5,371,510 A | 12/1994 | Miyauchi | |
| 5,374,917 A | 12/1994 | Hoffman et al. | |
| 5,422,625 A | 6/1995 | Sakaemura | |
| 5,821,935 A * | 10/1998 | Hartman et al. | 715/839 |
| 5,941,922 A | 8/1999 | Price et al. | |
| 5,982,368 A * | 11/1999 | Toffolo et al. | 715/835 |
| 6,060,985 A * | 5/2000 | Siviero | 340/461 |
| 6,185,491 B1 | 2/2001 | Gray et al. | |
| 6,377,879 B2 | 4/2002 | Kanno | |
| 6,667,726 B1 * | 12/2003 | Damiani et al. | 345/1.1 |
| 6,785,595 B2 | 8/2004 | Kominami et al. | |
| 6,789,007 B2 | 9/2004 | Ellis et al. | |
| 6,812,942 B2 * | 11/2004 | Ribak | 345/30 |
| 6,872,106 B2 | 3/2005 | Kanno | |
| 7,059,922 B2 | 6/2006 | Kawanishi | |
| 7,146,260 B2 | 12/2006 | Preston et al. | |
| 7,330,133 B2 | 2/2008 | Kawanishi et al. | |
| 7,385,490 B2 | 6/2008 | Okuyama | |
| 2002/0085035 A1 | 7/2002 | Orbanes | |
| 2003/0006892 A1* | 1/2003 | Church | 340/439 |
| 2003/0067384 A1 | 4/2003 | Funayose et al. | |
| 2003/0128103 A1* | 7/2003 | Fitzpatrick et al. | 340/425.5 |
| 2005/0040963 A1* | 2/2005 | Lo | 340/815.45 |
| 2005/0083187 A1* | 4/2005 | Birman et al. | 340/438 |
| 2005/0093714 A1* | 5/2005 | Kolar | 340/815.4 |
| 2005/0122213 A1 | 6/2005 | Kawanishi et al. | |
| 2005/0222726 A1 | 10/2005 | Furui et al. | |

FOREIGN PATENT DOCUMENTS

| | | |
|---|---|---|
| DE | 195 33 829 C1 | 9/1996 |
| EP | 0 810 121 A1 | 12/1997 |
| EP | 0 895 892 | 2/1999 |
| JP | 04-35927 | 3/1992 |
| JP | 6-27978 | 4/1994 |
| JP | 2001-4953 | 1/2001 |
| WO | WO 99/45399 A1 | 9/1999 |

OTHER PUBLICATIONS

European Search Report dated Mar. 4, 2005 for Application No. EP 04 025224.
European Search Report dated Nov. 21, 2007 for Application No. EP 04 79 2527.

* cited by examiner

DISPLAY DEVICE FOR WATERCRAFT

CROSS-REFERENCE TO RELATED APPLICATIONS

This application is a continuation of PCT Application No. PCT/JP2004/015358, which was filed on Oct. 18, 2004 and published in Japanese on Jul. 21, 2005 as WO 05/065979 A1, the entire contents of which are incorporated herein by reference and should be considered a part of this specification. The above PCT application claims priority to Japanese Patent Application No. 2004-000980, filed on Jan. 6, 2004.

BACKGROUND OF THE INVENTION

1. Field of the Invention

This invention relates to a display device for a vehicle to indicate various status data values regarding the conditions of an engine therefore, and in particular to a display device for a watercraft to indicate various status data values regarding the conditions of an outboard motor, such as engine speed, trim angle, cooling water temperature, battery voltage, and oil level.

2. Description of the Related Art

Conventional display devices for a watercraft, which indicate various status data values of outboard motor conditions, are known. Such devices provide special display regions for indicating watercraft speed or engine speed, as well as trim angle of the outboard motor. Oil level meters are generally provided independently to indicate the oil level, such as by the lighting position among the three lamps. One such display device is described in Japanese Patent Document JP-B-Hei 6-027978.

However, such devices do not clearly specify how to indicate other status data values regarding the outboard motor conditions, including, for instance: cooling water temperature, cooling water pressure, battery voltage, and oil pressure.

Additionally, a problem with such conventional display devices is that dedicated meters must be provided for every type of status data to be displayed. Therefore, as the number of status data to be displayed is increased, a larger installation space is necessary to accommodate all the display devices for a watercraft. In addition, as these meters are of a built-in type, all of them would come into an operator's view at any time, requiring a substantial work load and mental strain on the operator's part for visually recognizing the information on the meters.

SUMMARY OF THE INVENTION

To solve the above problems, a display device is provided for a watercraft to indicate various status data related to the conditions of the outboard motor (e.g., cooling water temp, engine speed, trim angle, oil level, etc.), while allowing the reduction of the device size, and the improvement of the visual recognition ability.

One aspect of the present invention involves a display device for a watercraft to indicate various status data values regarding the conditions of an outboard motor, such as cooling water temperature, battery voltage, and oil level. The display device comprises a dot matrix display provided as a part of display region, in which dots capable of being turned on and off are arranged in the form of matrix, and the status data values are indicated by means of the lighting pattern of the dots.

Another aspect of the present invention involves a display device for a watercraft to indicate various status data values regarding the conditions of an outboard motor, such as cooling water temperature, battery voltage, and oil level. The display device comprises a display region having a dot matrix display including a plurality of dots, the dots being arranged in the matrix and adapted to be selectively turned on and off to form a pattern, the pattern adapted to illustrate at least one status data value. The display device also comprises an information mark display section disposed proximal the dot matrix display and configured to display at least one information mark corresponding to the at least one status data value, the information mark identifying a category of the status data. The display device further comprises means for varying the display position of the at least one information mark indicated on the information mark display section and the display position of the at least one status data value on the dot matrix display.

Accordingly, a display device for a vehicle (e.g., watercraft) can be provided that can display the desired data selected by the watercraft operator or the software responsible for collection and management of information regarding the boar's operation.

BRIEF DESCRIPTION OF THE DRAWINGS

These and other features, aspects and advantages of the present invention will now be described in connection with a preferred embodiment of the invention, in reference to the accompanying drawings. The illustrated embodiment, however, is merely an example and is not intended to limit the invention. The drawings include the following eight figures.

DETAILED DESCRIPTION OF THE PREFERRED EMBODIMENTS

Figure 1:
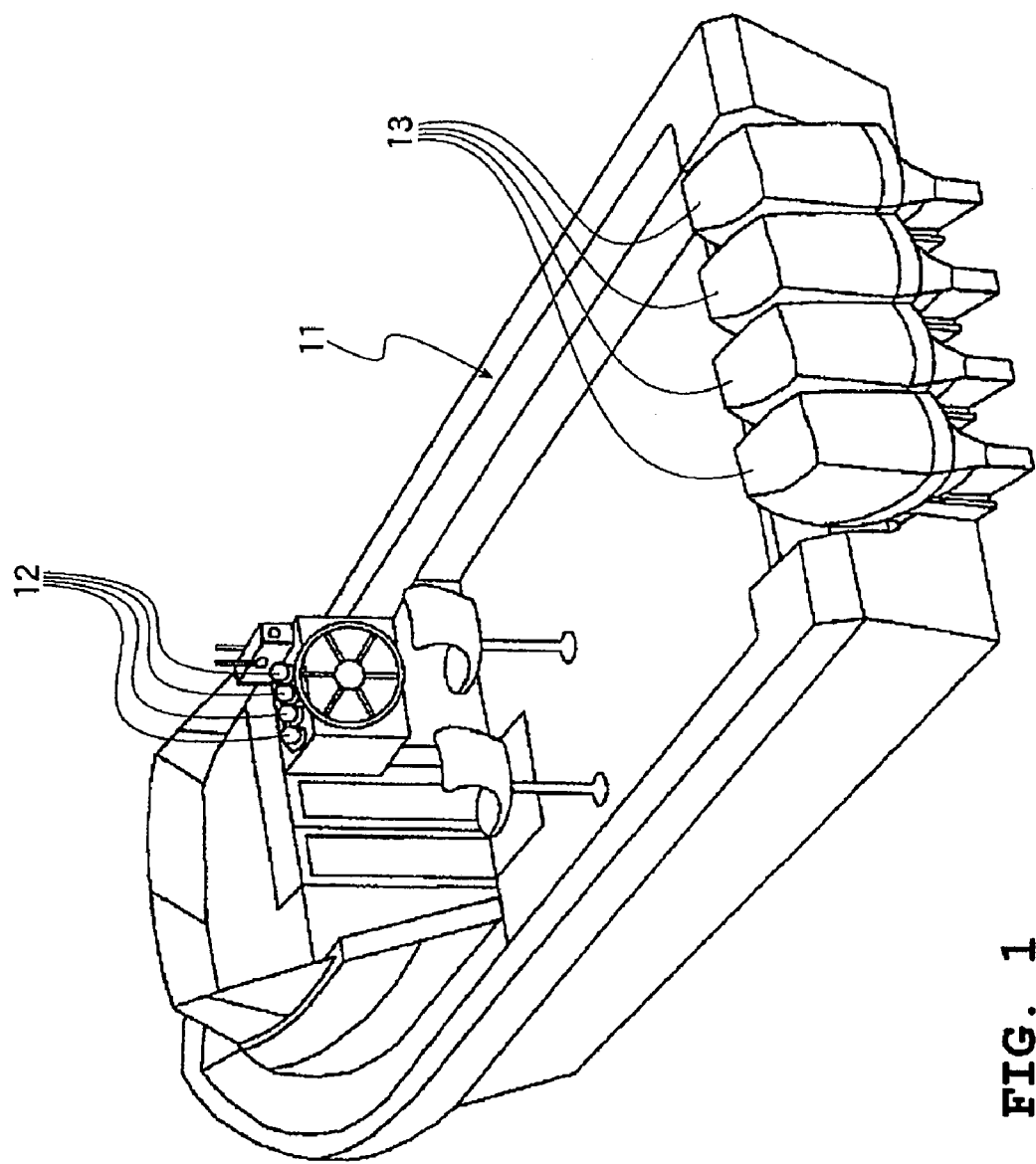
FIG. 1 is a perspective view of a hull according to one embodiment.

FIG. 1 illustrates a hull 11 with a total of four (4) display devices 12 provided in front of the operator's seat on the hull 11, and a total of four (4) outboard motors 13 provided at the rear of the hull 11. However, any number of display devices 12 or outboard motors 13 can be provided. These multiple outboard motors 13 and display devices 12 are preferably connected by means of LAN (Local Area Network). While the devices on the inboard network are preferably hardwired together, in other applications some or all of the communication lines among the components (e.g., the display devices and the outboard motors) on the network can be wireless (e.g., employ IR communication). The inboard network system is preferably configured such that each outboard motor 11 is coupled to a respective display device 12. Therefore, the following discussion regarding one display device 12 and one outboard motor 11 is applicable to the other outboard motors 11 and respective display devices 12. Though the discussion below is directed to the use of display devices 12 in combination with outboard motors 13 of watercraft, the display devices 12 can also be used in combination with other engine types and with other vehicles. Additionally, although the display devices 12 are disclosed within the concept of a network, the display devices 12 can also be used in a non-networked application.

Figure 2:
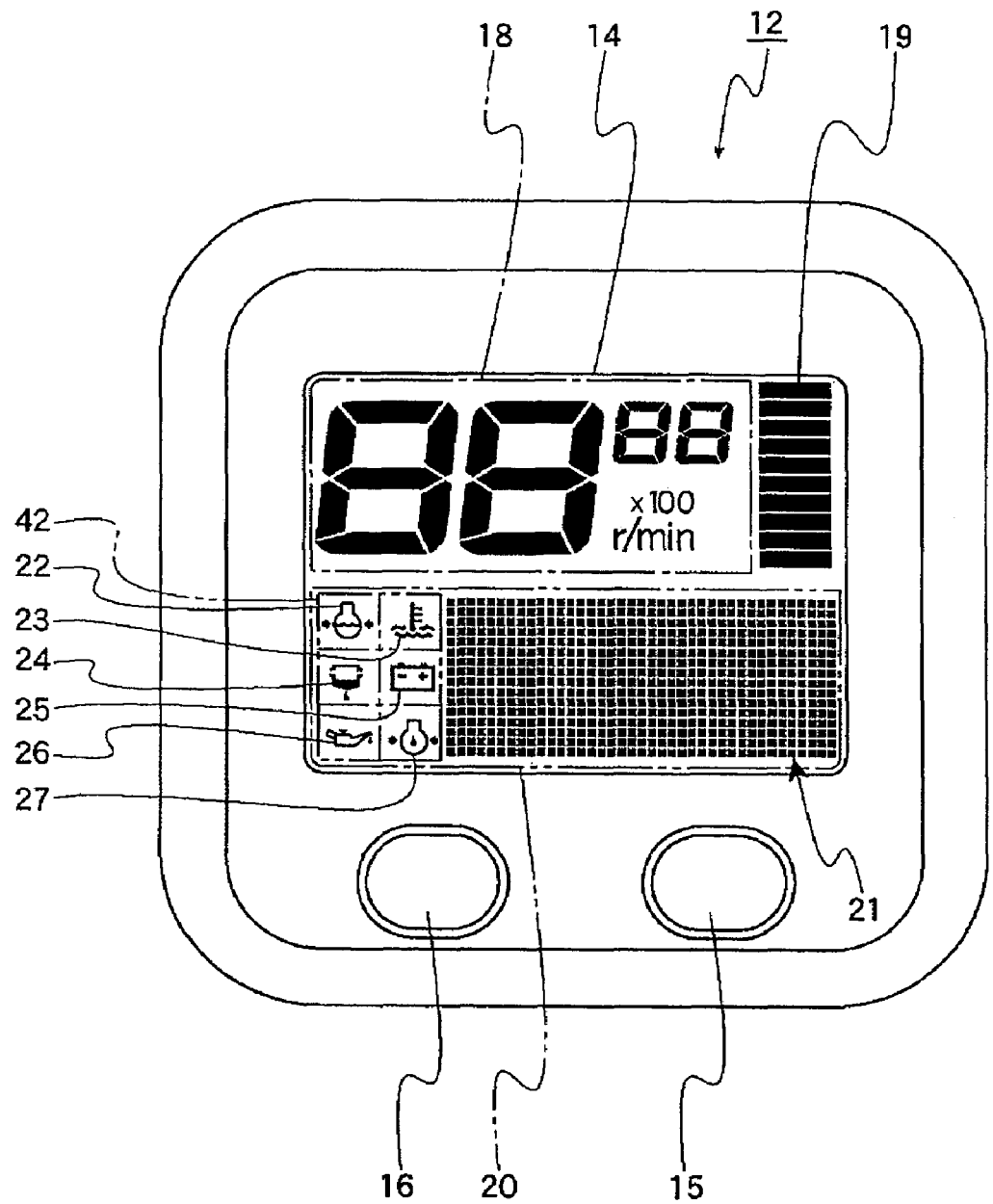
FIG. 2 is an elevation view of a display device according to one embodiment.

As shown in FIG. 2, one embodiment of the display device 12 is provided with a display section 14 for showing various status data values related to the condition of the corresponding outboard motor 13. A mode selecting switch 15 and a set switch 16 are provided below the display section 14. As further described below, the display device 12 is designed so that users can select the contents of the display section 14, as desired, by properly pressing down the mode selecting switch 15 and the set switch 16.

As shown in FIG. 2, the display section 14 includes in general: an engine speed display section 18 for displaying the speed of the engine on the outboard motor 13, a trim position display section 19 for displaying trimming position of the outboard motor 13, and a multi-display section 20 for displaying various kinds of status data values related to the condition of the outboard motors 13 such as, for example: cooling water temperature (hereinafter referred to as "water temperature"), cooling water pressure (hereinafter referred to as "water pressure"), battery voltage, engine oil level (hereinafter referred to as "oil level"), engine oil pressure (hereinafter referred to as "oil pressure"), total accumulated engine operating hours and accumulated trip hours. The noted displayed fields of course are merely exemplary of the type of fields that can be displayed by the screen setting program.

In the illustrated embodiment, the engine speed display section 18 displays engine speed as a two-digit integer number in units of 100 r/min. In addition, in the trim position display section 19, the trim position of the outboard motor 13 is indicated with vertically extending meter having segments lighted up one by one from the bottom to indicate the present trim position.

As shown in FIG. 2, the multi-display section 20 has a dot matrix display 21, wherein dots are arranged in a matrix and each dot can be lighted on or off freely. The multi-display section 20 also has an information mark display section 42 provided at the side of the dot matrix display 21 for showing information marks to indicate the meaning and contents of the status data value displayed in the dot matrix display 21.

In a preferred embodiment, the dot matrix display 21 is divided into a plurality of regions 41 laid out vertically in sections, with each region 41 displaying a different status data value. In the embodiment illustrated in FIG. 3, the dot matrix display 21 has three regions 41. However, the dot matrix display 21 can have any suitable number of regions 41. The regions 41 illustrated in FIG. 3 have a rectangular shape. However, the regions 41 can have other suitable shapes, such as square. Additionally, the dot matrix display 21 can be set-up to vary the number of regions 41 depicted in the dot matrix display 21. Accordingly, the size of the display device 12 can be further reduced (i.e., made compact).

Figure 3:
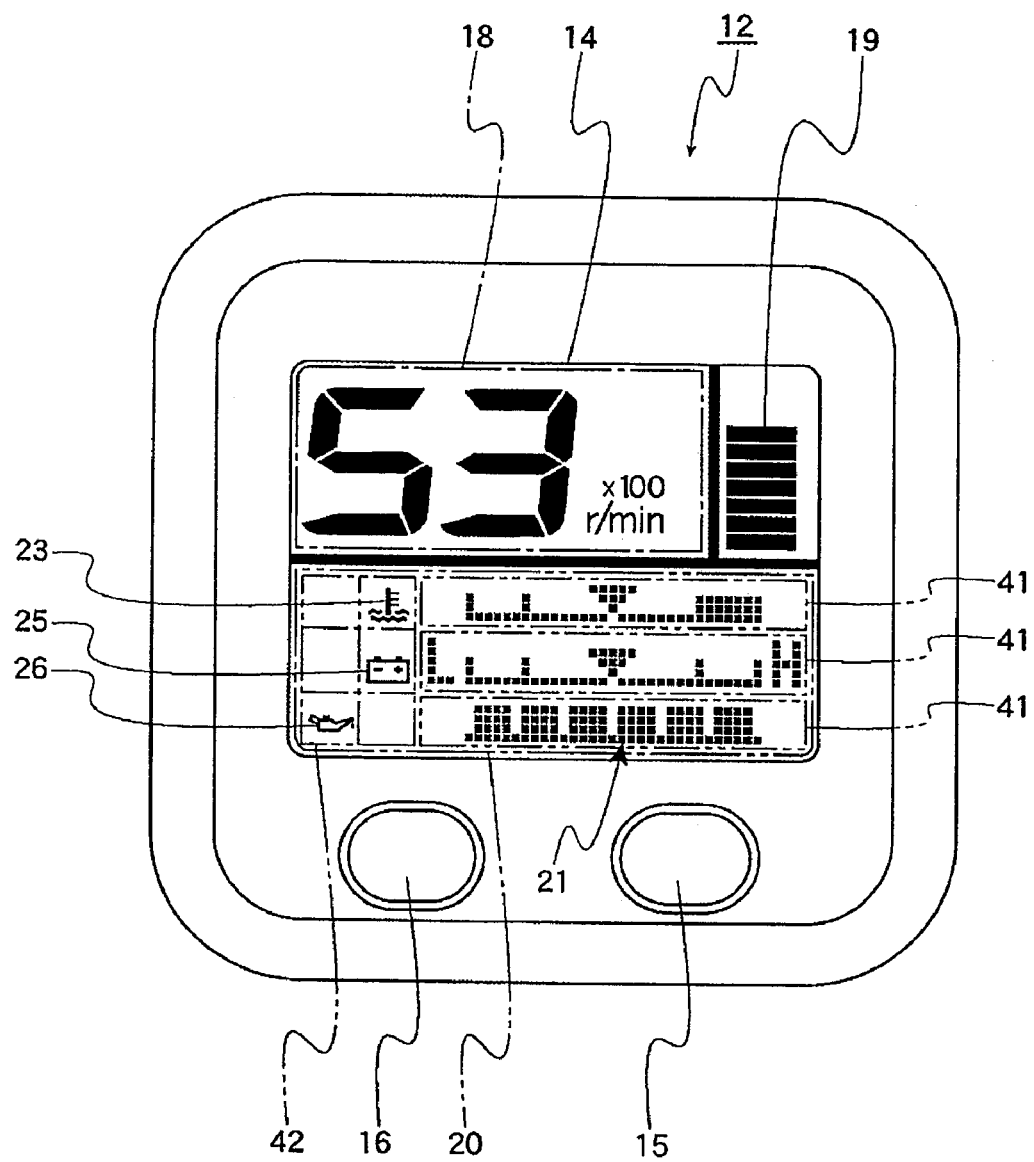
FIG. 3 is an elevational view of one embodiment of a display screen configuration of the display device in FIG. 2, showing the status data for an outboard motor 13.

As shown in FIG. 3, the display form of the status data values indicated in each region 41 of the dot matrix display 21 may be varied, which further allows for the reduction in the size of the display device 12. In the illustrated embodiment, the display form of the status data values indicated in each region 41 are either graduations (scale display) or a line of numerals or characters, depicted by the lighting pattern of the dot-matrix. However, other suitable display forms can be used. Advantageously, the display forms are readily recognizable, so as to provide a display device with improved visual recognition ability.

In one embodiment, as shown in FIG. 3, the display position of the information marks indicated in the information mark display section 42, and the display position of the status data values corresponding to the information mark and indicated in the dot matrix display 21 are arranged on the display device 12 so as to be aligned with each other side by side. In one embodiment, the display position of the information marks and the display position of the status data values are adjacent each other. Advantageously, said arrangement of the information marks and the status data values allows the meaning and contents of the status data value to be readily and clearly recognized at a glance, providing a display device with improved recognition of status data values.

In the illustrated embodiment, the information mark display section 42 is divided into grids arranged in the form of matrix. Predetermined information marks can be lighted on or off freely in each grid. Turning on or off of the light for the information mark can be set up variably for each grid. Accordingly, a display device can advantageously be provided with only the desired information marks being lighted for improved recognition of the status data values.

As shown in FIG. 3, the information mark lighted in each grid is a graphic (mark) for identifying the type of status data displayed in each rectangular region 41 of the dot matrix display 21. For instance, FIG. 3 shows an example of display conditions on the multi-display section 20 while the hull is in the normal operating condition. The dot matrix display 21 is divided into three (3) sections or regions 41. Water temperature, battery voltage, and oil level are displayed in the top section, the intermediate section, and the bottom section, respectively, by means of the scale (graduations) stimulatingly depicted with the dot-matrix lighting pattern.

In the embodiment shown in FIG. 2, the information mark display section 42 is a grid arranged in the form of a matrix and divided into three (3) rows and two (2) columns. A number of marks are depicted in the grid, among which are: a water pressure mark 22 located at the first column in the first row, a water temperature mark 23 located at the second column in the first row, a water accumulation mark 24 located at the first column in the second row, a battery mark 25 located in the second column in the second row, an oil level mark 26 located in the first column in the third row, and an oil pressure mark 27 located in the second column in the third row, each of which is ready to be turned on.

In FIG. 3, only the water temperature mark 23, the battery mark 25, and the oil level mark 26 are turned on. These three (3) information marks being turned on allow identification of the category of the status data value displayed in the three (3) regions 41 of the dot matrix display 21 next to the information marks.

In one preferred embodiment, the display section 14 is configured with a liquid crystal display. Since high visibility is required anytime day or night from the display, the display 14 should be a transmissive liquid crystal display having a back light of intensive brightness, or a reflective liquid crystal display with a front light. Alternatively, the display section 14 can include dotted, light-emitting diodes of intense brightness and arranged in the form of matrix.

Besides the scale, a warning symbol depicted by the lighting pattern of the dot-matrix may be displayed in each region 41 of the dot matrix display 21. For instance in the region 41 at the intermediate section in FIG. 3, symbols of L (Low) and H (high), indicating that the battery voltage is in the risk level, are displayed by means of dot-matrix at both ends of the scale. As shown in FIG. 3, where plural scales are displayed, the scales preferably have generally the same horizontal expansion in order to improve the visual recognition ability.

Arrangements are made so that the plurality of status data values regarding the conditions inside of the outboard motor 13, as the subject of such display, are transmitted to the display device 12 via the LAN. In the display device 12, arrangements are made to select the status data values necessary for the display among the data values from the outboard motor 13, and to display them at the predetermined position in the display section 14.

Figure 4:
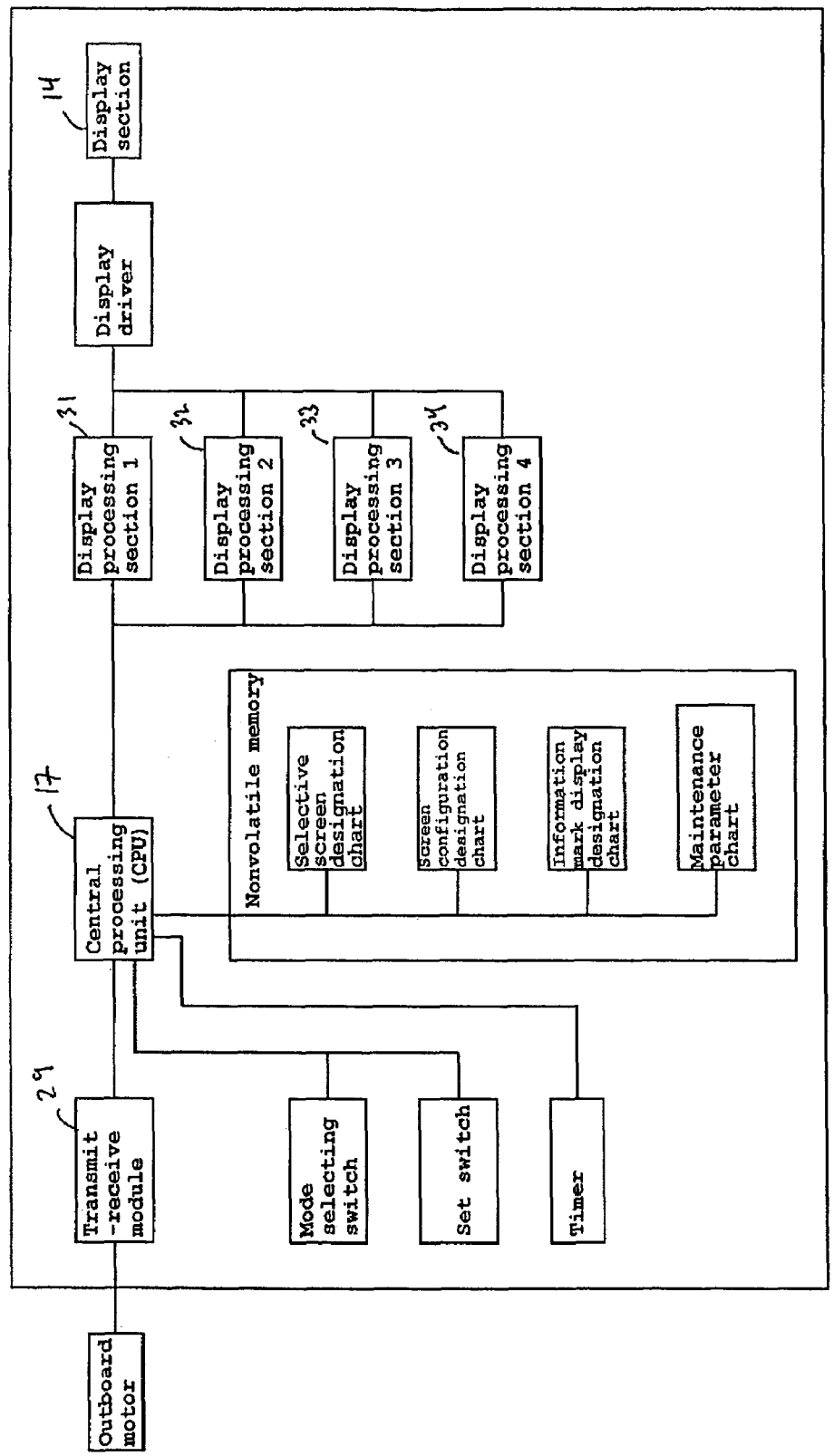
FIG. 4 is a logic bloc diagram illustrating the operation of one embodiment of a display device.

While the outboard motor 13 is in its operating condition, revolution speed data, trim position data, and other status data values regarding the conditions of the outboard motor 13 are transmitted from the outboard motor 13 side to the display device 12 via the LAN, as shown in FIG. 4. A CPU 17 of the display device 12 receives these varieties of data via a transmit-receive module 29. Once various status data values for the outboard motor 13 are received by the CPU 17, the CPU 17 transmits the revolution speed data value to the revolution bers for the dot matrix display 21. Further, two (2) kinds of information are stored in each field, determined by specifying the row and the column of this database.

The first one of the two (2) kinds of information is to identify if the relevant status data value should be displayed or not, and to specify the form of display regarding the relevant screen configuration number. The value of the first information denotes that the relevant status data value will not be displayed if it is " "(i.e., blank). The relevant status data value will be displayed in the form of scale if it is "S." The relevant status data value will be displayed in characters by using a series of letters or numerals if it is "C." Alternatively, the relevant status data value will be displayed in both scale and characters if it is "SC". The second one of the two (2) kinds of information is to specify in which section of the dot matrix display 21 the relevant status data value should be displayed.

In addition, the total number of the status data values displayed for each screen configuration number is stored in the second column of the screen configuration designation chart.

Table 1 shows an example of the screen configuration designation chart.

TABLE 1

| Screen Configuration Designation Chart | | | | | | | | |
|---|---|---|---|---|---|---|---|---|
| Screen Configuration No. | Display Data | Cooling Water Temp. | Cooling Water Pressure | Battery Voltage | Oil Level | Oil Pressure | Engine Operating hrs. | Trip hrs. |
| 0 | 0 | | | | | | | |
| 1 | 3 | S/$1^{st}$ row | | S/$2^{nd}$ row | S/$3^{rd}$ row | | | |
| 2 | 3 | | S/$1^{st}$ row | S/$2^{nd}$ row | S/$3^{rd}$ row | | | |
| 3 | 2 | S/$1^{st}$ row | | S/$2^{nd}$ row | | | | |
| 4 | 2 | S/$1^{st}$ row | | | S/$2^{nd}$ row | | | |
| 5 | 2 | S/$1^{st}$ row | | | | | C/$2^{nd}$ row | |
| 6 | 2 | | S/$1^{st}$ row | C/$2^{nd}$ row | | | | |
| 7 | 2 | | S/$1^{st}$ row | | S/$2^{nd}$ row | | | |
| 8 | 2 | | S/$1^{st}$ row | | | | C/$2^{nd}$ row | |
| 9 | 2 | | | S/$1^{st}$ row | S/$2^{nd}$ row | | | |
| 10 | 2 | | | S/$1^{st}$ row | | | C/$2^{nd}$ row | |
| 11 | 2 | | | | S/$1^{st}$ row | | C/$2^{nd}$ row | |
| 12 | 1 | S/$1^{st}$ row | | | | | | |
| 13 | 1 | | S/$1^{st}$ row | | | | | |
| 14 | 2 | | | SC/$1^{st}$ row | | | | |
| 15 | 1 | | | | S/$1^{st}$ row | | | |
| 16 | 2 | | | | S/$1^{st}$ row | S/$1^{st}$ row | | |
| 17 | 2 | | | | | | C/$1^{st}$ row | C/$2^{nd}$ row | speed display processing section. The CPU 17 also transmits the trim position data value to the trim position display processing section.

Similarly, the CPU 17 performs the display process for other status data values. In the course of such data processing, the CPU 17 makes reference to a screen configuration designation chart, an information mark display designation chart, and a selective screen designation chart, which have been stored in nonvolatile memory contained in the display device 12.

In one preferred embodiment, the screen configuration designation chart stores more than two patterns of screen configuration for the dot matrix display 21. Specifically, the screen configuration designation chart is a data base in the form of a matrix, in which each column corresponds to the category of status data values such as water pressure, water temperature, battery voltage, oil level, oil pressure, accumulated engine operating hours, and accumulated trip hours, while each row corresponds to the screen configuration num- The information mark display designation chart stores the information regarding the type of information marks to be displayed in the information mark display section 42, and its display position for each screen configuration. That is, the information mark display designation chart is a data base in the form of a matrix, in which each column corresponds to the types of information marks, such as: the cooling water pressure mark 22, the cooling water temperature mark 23, the water accumulation mark 24, the battery mark 25, the oil level mark 26, the oil pressure mark 27. Each row corresponds to the screen configuration numbers. Further, each field determined by specifying the row and the column of this database stores the information for designating in which column and row in the information mark display section 42 the relevant information mark should be displayed in regard to the relevant screen configuration number. If this field if blank, the relevant information mark is not displayed for the relevant screen configuration number. For example, the water accumulation mark 24 among the above-mentioned six (6) information marks is not displayed in the normal condition. The water accumulation mark 24 blinks as a warning only when water accumulation is detected in the fuel filter. Table 2 shows an example of the information mark display designation chart.

TABLE 2

Information Mark Display Designation Chart

| Screen Configuration | Water Temp. Mark | Water Pressure Mark | Battery Mark | Oil Level Mark | Oil Pressure Mark |
|---|---|---|---|---|---|
| 0 | | | | | |
| 1 | ON | | ON | ON | |
| 2 | | ON | ON | ON | |
| 3 | ON | | ON | | |
| 4 | ON | | | ON | |
| 5 | ON | | | | |
| 6 | | ON | ON | | |
| 7 | | ON | | ON | |
| 8 | | ON | | | |
| 9 | | | ON | ON | |
| 10 | | | ON | | |
| 11 | | | | ON | |
| 12 | ON | | | | |
| 13 | | ON | | | |
| 14 | | | ON | | |
| 15 | | | | ON | |
| 16 | | | | | ON |
| 17 | | | | | |

The selective screen designation chart stores the screen configuration numbers to which the screen may be switched by means of the mode selecting switch 15. Table 3 shows an example of the information mark display designation chart.

TABLE 3

Selective Screen Designation Chart

| Selective Screen 1 | Screen Configuration No. 1 |
|---|---|
| Selective Screen 2 | Screen Configuration No. 2 |
| Selective Screen 3 | Screen Configuration No. 3 |
| Selective Screen 4 | Screen Configuration No. 4 |

Initially, the CPU 17 refers to the first row of the selective screen designation chart to acquire the screen configuration number allocated to the selective screen 1. Then, it refers to the row in the screen configuration designation chart that corresponds to the acquired screen configuration number. Referring to the information values in each column of the applicable row, and if the status data value corresponding to that column needs to be displayed, the CPU 17 transmits the relevant information value to a dot-matrix display processing section 31. At this time, the CPU 17 simultaneously transmits the total number of the status data values displayed in the relevant screen configuration number. This is because the height of the rectangular region 41 of the dot-matrix section 21 in which the relevant data value is displayed, is determined based on the total number of status data values to be displayed.

Also, the CPU 17 refers to the row in the information mark display designation chart that corresponds to the screen configuration number of the selective screen 1. Referring to the information value in each column of the row, and if the information mark corresponding to that column needs to be displayed, the CPU 17 transmits the relevant information value to an information mark display processing section 31 that is responsible for carrying out the information mark display process.

Display processing sections 31 through 34 receive data from the CPU 17, perform predetermined processing to create data for display, and transmit them to a display driver. Then, the display driver outputs the control signal for display to the display section 14.

As the contents of the screen configuration designation chart, the information mark display designation chart, and the selective screen designation chart are specified as shown in Tables 1 through 3, the display condition on the display section 14, as shown in FIG. 3, is achieved by means of the action described above.

As has been described so far, since the screen configuration on the display section 14 of the display device 12 can be set up freely by the discretional setting of the contents in the screen configuration designation chart, the information mark display designation chart, and the selective screen designation chart, the display device 12 for a watercraft can be provided to display various status data related to the conditions of the outboard motor 13, while achieving a device of reduced size and improved visual recognition ability.

Figure 5:
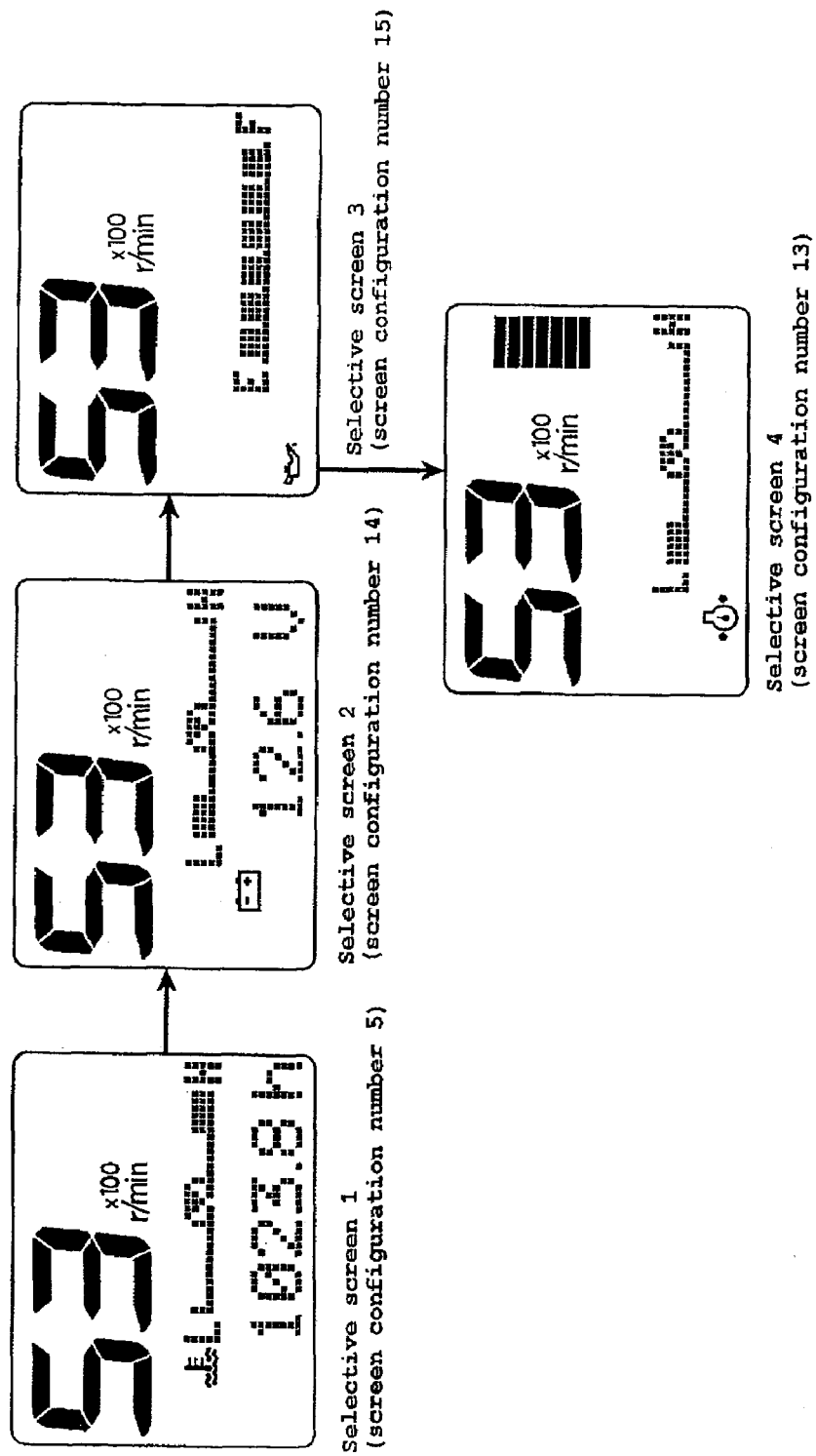
FIG. 5 is an illustration of a transition sequence between different display screen configurations of one embodiment of the display device.
Figure 6:
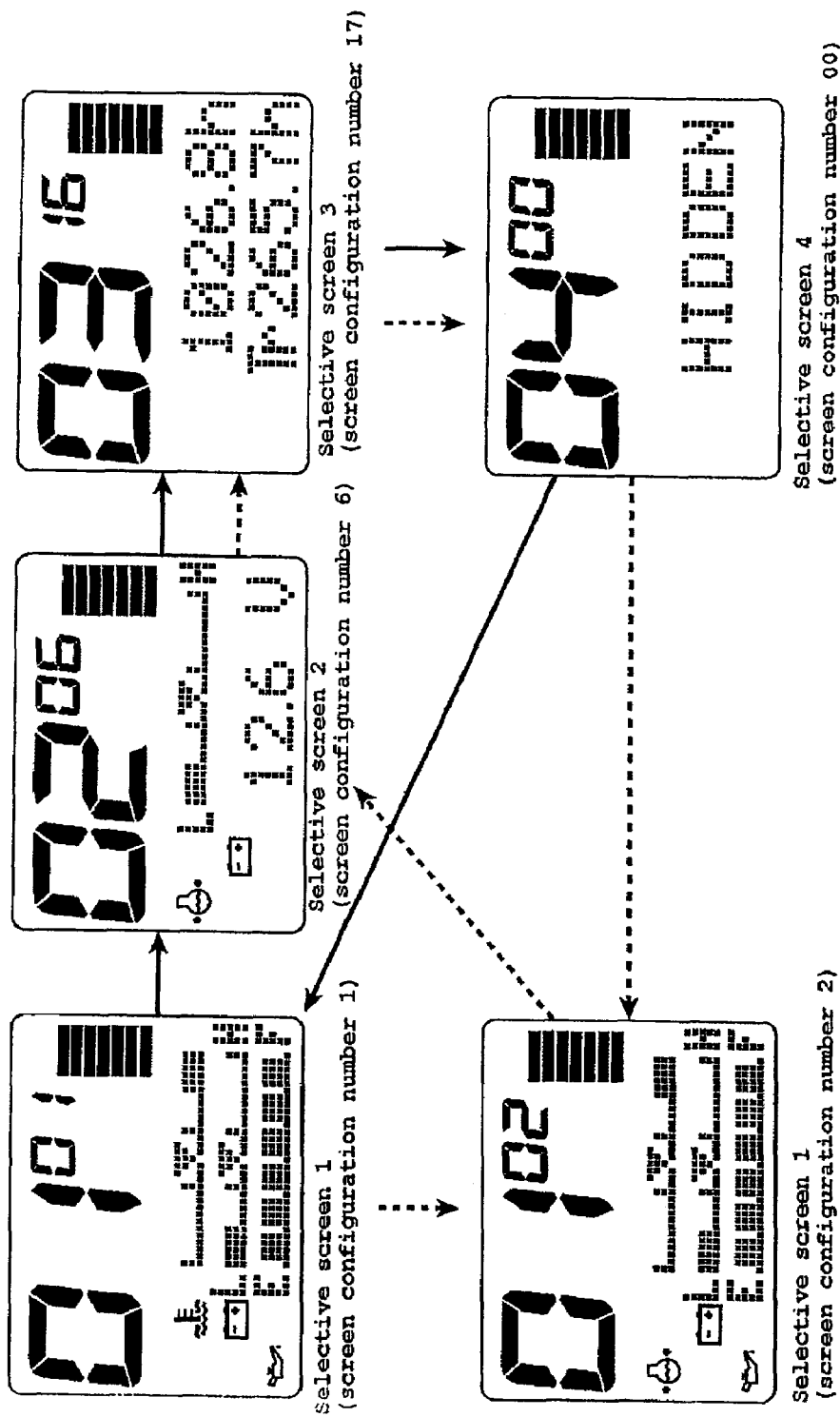
FIG. 6 is an illustration of another transition sequence between different display screen configurations for the display device.

FIG. 5 is an illustration for explaining one of the transition flows or sequences of the display screen on the display device 12 according to one embodiment. FIG. 6 is an illustration for explaining another transition flow or sequence of the display screen on the display device 12 according to one embodiment.

As described above, the screen configuration designation chart in Table 1, and the information mark display designation chart in Table 2 stores plural patterns of screen configuration on the dot matrix display 21, and the information mark display section 42 of the display section 14. This allows a user to select their desired screen configuration by providing appropriate user interface. An example of such user interface, which is composed using the mode selecting switch 15 and the set switch 16, is described below Tables 4-6 show an example of contents for the selective screen designation chart in the nonvolatile memory of the display device 12.

TABLE 4

Selective Screen Designation Chart

| Selective Screen 1 | Screen Configuration No. 5 |
|---|---|
| Selective Screen 2 | Screen Configuration No. 14 |
| Selective Screen 3 | Screen Configuration No. 15 |
| Selective Screen 4 | Screen Configuration No. 16 |

TABLE 5

Selective Screen Designation Chart

| Selective Screen 1 | Screen Configuration No. 1 |
|---|---|
| Selective Screen 2 | Screen Configuration No. 6 |
| Selective Screen 3 | Screen Configuration No. 17 |
| Selective Screen 4 | Screen Configuration No. 0 |

TABLE 6

Selective Screen Designation Chart

| Selective Screen 1 | Screen Configuration No. 2 |
|---|---|
| Selective Screen 2 | Screen Configuration No. 6 |
| Selective Screen 3 | Screen Configuration No. 17 |
| Selective Screen 4 | Screen Configuration No. 0 |

In the normal condition, that is, when CPU 17 is carrying out no interruption processing that arises as a user actuates the mode selecting switch 15 or set switch 16, the screen configuration number specified as selective screen 1 is referenced to by the CPU 17, as described above. Then, CPU or controller 17 refers to the row corresponding to the screen configuration number in the screen configuration designation chart and in the information mark display designation chart, and controls the screen display on the display section 14 in accordance with the contents of the referred row.

Now, the behavior when interruption processing is performed as a user actuates the mode selecting switch 15 is described. Every time the mode selecting switch 15 is actuated (e.g., pressed down) by a user, the CPU 17 cyclically switches the screen configuration on the multi-display section 20 as selective screen 1→selective screen 2→selective screen 3→selective screen 4→selective screen 1. That is, the CPU 17 changes cyclically the position of the row to which it refers on the selective screen designation chart as; second row→third row→fourth row→first row, and so on. As the position of the referenced row is changed, the CPU 17 displays the current status data values on the display section 14 in accordance with the screen configuration number of the referring row. For instance, when the contents of selective screen designation chart in Table 4 is applied, the screen display based on the screen configuration number 5 is presented in normal condition. However, every time the user presses down the mode selecting switch 15, the screen configuration on the display section 14 changes cyclically as screen configuration number 14→screen configuration number 15→screen configuration number 13→screen configuration number 5, and so on. A series of screen configurations switching as described above are shown in FIG. 5.

When the mode selecting switch 15 or set switch 16 is not actuated (e.g., pressed down) for a predetermined period of time, e.g. for 10 seconds, the CPU 17 restores the processing under normal condition. In other words, it presents the screen display based on the screen configuration number specified as the selective screen 1.

Next, the behavior when the set switch 16 is actuated by a user is described. Assume one of the selective screens is displayed as a result of actuating (e.g., pressing down) the mode selecting switch 15 by a user. Here, each time the set switch 16 is actuated by a user, CPU 17 switches the screen configuration cyclically as screen configuration number 1→screen configuration number 2→screen configuration number 3→ . . . screen configuration number 16→screen configuration number 1, indicating the current status data values on such selective screen.

If the mode selecting switch 15 is actuated by the user at some point in the process, the screen configuration number presented at that time shall be applied to the selective screen. In other words, the contents of the row corresponding to the switched selective screen number in the selective screen designation chart are overwritten on the screen of the relevant screen configuration number.

For instance, when the contents of selective screen designation chart in Table 5 is applied, the screen display is switched as shown in FIG. 6 every time the mode selecting switch 15 is actuated (e.g., pressed down) by users. Now, if the set switch 16 is pressed down while the selective screen 1 is displayed, the screen configuration number is altered cyclically as; screen configuration number 1→screen configuration number 2→ . . . every time the set switch 16 is pressed down, and the current status data values are displayed on the selective screen 1 with altering screen configuration number. Then, if the mode selecting switch 15 is pressed down by users while the screen configuration number 2, for instance, is being applied to the screen display, the screen configuration allocated to this selective screen 1 is changed to the screen configuration number 2 in the subsequent process. That is, the content of the selective screen designation chart is rewritten as shown in Table 6, and the screen will be switched in accordance with the contents of Table 6 in the subsequent process. Accordingly, the screen will be switched in sequence as shown in FIG. 6, once the screen selection is carried out as the mode selecting switch 15 is pressed down by users.

In addition, the data value display for the engine revolution speed and the trim position is suspended on each screen of the display section 14 shown in FIG. 6 in order to show a boat operator clearly that the screen setting mode is currently active. Instead, the selective screen number of the present display is presented in two-digits by larger numerals, and the screen configuration number of the present display is presented in two-digits by smaller numerals, utilizing the display function of the engine revolution speed display section 18.

One embodiment of a user interface configured by using the mode selecting switch 15 and the set switch 16 for switching the selective screen of multi-display section 20 and for setting the screen configuration of each selective screen has been described in the foregoing sections. However, the configuration of user interface is not limited by any means to what has been described above.

As have been explained in the foregoing sections, users can switch the display of the multi-display section 20 on the display section 14 at any time and over the plural number of screens. In addition, users can set the screen configuration of each selective screen in any desirable manner. Thus, there is no need for squeezing a lot of status data values display into one screen, and users can allocate the data on each screen so as to provide the highest visibility to each user. With this arrangement, the display device 12 for a watercraft with substantially reduced workload and mental strain required for the visual recognition of the display can be provided.

Now, screen conditions of the display section 14 upon activation of the display device 12 are described in the following sections. When the power to the display device 12 is turned on, the CPU 17 indicates an activation display on the display section 14 for a period of about 1.0 second. From between about 1.0 to 3.0 seconds after the activation, the CPU 17 indicates a test pattern on the display section 14. From between about 3.0 to 4.0 seconds after the activation, the CPU 17 indicates the revolution speed in the revolution speed display section 18, and the trim position in the trim position display section 19, along with the accumulated operation hours and trip hours on the multi-display section 20. From about 4.0 seconds onward after the activation, the CPU 17 refers to a maintenance parameter chart that is included in the nonvolatile memory storing the data related to the maintenance of the outboard motor 13. Then, if any requirement for maintenance is detected, the CPU 17 indicates the message to this effect on the multi-display section 20. If there are plural requirements for maintenance, the maintenance message for each requirement is indicated alternately by switching it at about every 3.0 seconds. Display of the maintenance message continues until the mode selecting switch 15 is actuated (e.g., pressed down) by the user. In one embodiment, the timing for requiring the oil change, the timing for requiring impeller inspection, and other information are registered in the maintenance parameter chart.

If no maintenance requirements are detected, or if the maintenance message display is canceled as the mode selecting switch 15 is pressed down by users while the maintenance message is being indicated from about 4.0 seconds onward after the activation, then transition to the normal mode takes place. That is, the CPU 17 starts the display processing of the status data values to display them on the display section 14, as described above.

Figure 7:
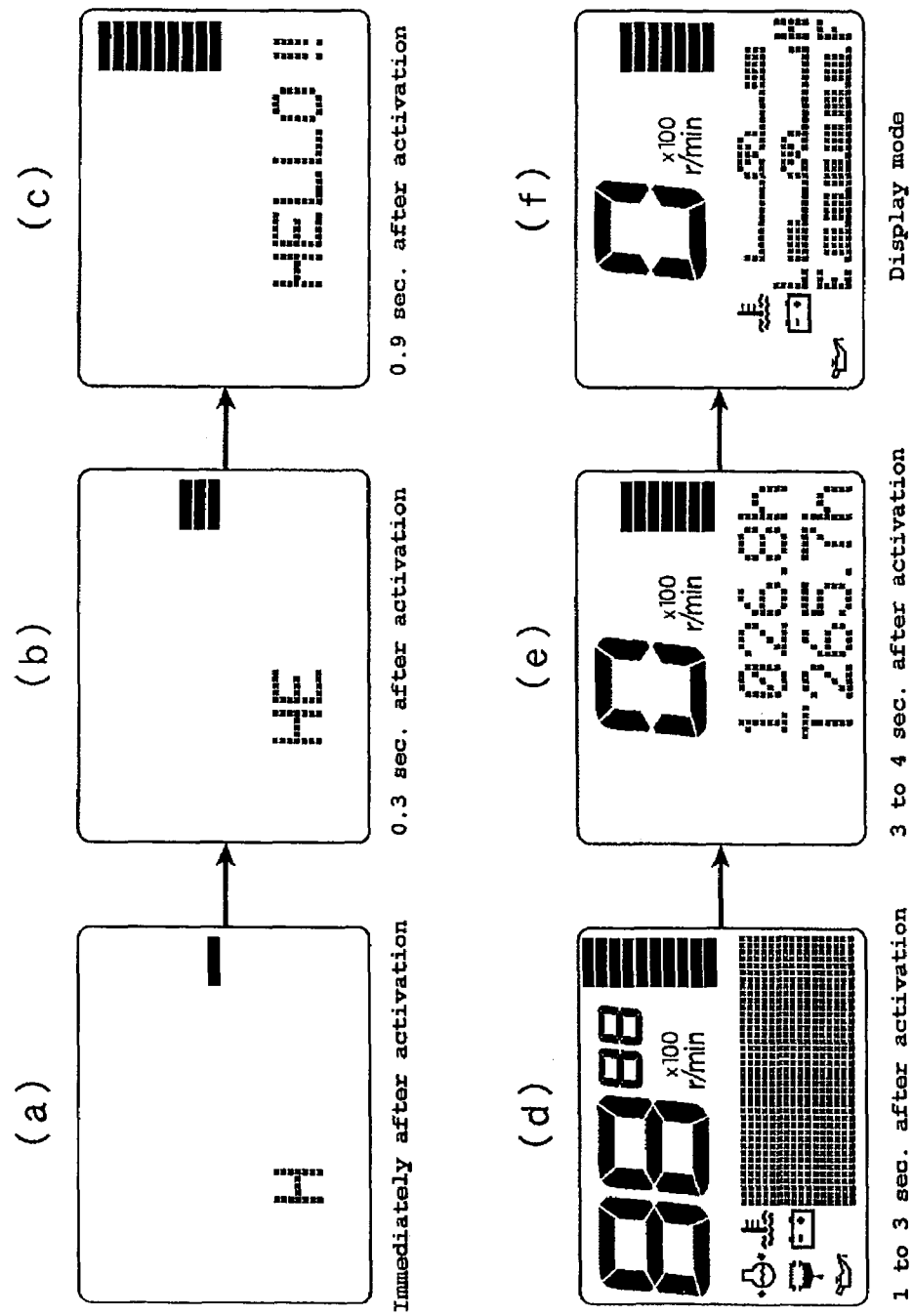
FIG. 7 is an illustration of the transition sequence after the activation of the display screen on the display device, in accordance with one embodiment.

FIG. 7 shows one example of a screen display transition sequence at the time of device activation. For about 1.0 second after activation, the message "HELLO!!" is displayed on the multi-display section 20 as a start-up screen ((a) through (c)). At the same time, the segments in the trim position display section 19 are turned on adding one by one from the bottom at every 0.1. From between about 1.0 to 3.0 seconds after activation, the revolution speed display section 18, the trim position display section 19, and the multi-display section 20 are all turned on as the test pattern for liquid crystal display operation ((d)). From between about 3.0 to 4.0 seconds, the revolution speed, the trim position, the accumulated operating hours, and the trip hours are indicated on the display section 14 ((e)). In the case shown in FIG. 7, it moves into the normal mode from about 4.0 seconds onward after the activation, since no maintenance requirements have been detected after the activation ((f)). Then, the screen as shown in FIG. 3 is indicated. On the contrary, if any maintenance requirements have been detected after the activation, the maintenance messages as shown in FIG. 8 are displayed prior to the transition to the normal mode.

Figure 8:
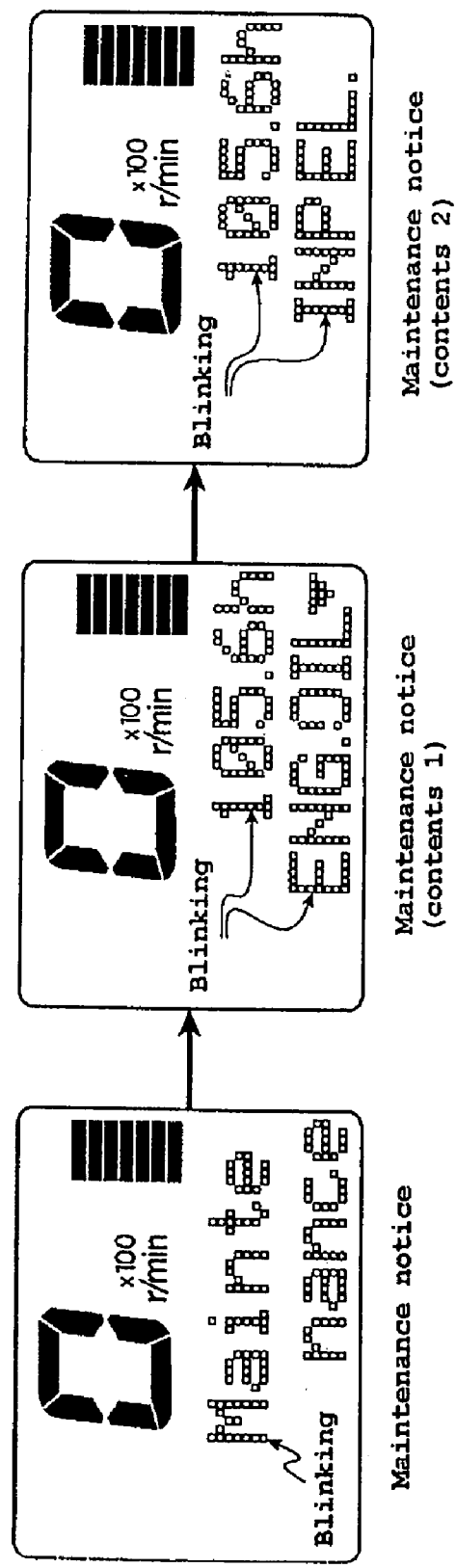
FIG. 8 is an illustration of the transition sequence of the display screen on one embodiment of the display device during a maintenance message display mode.

As have been described, the display device 12 for a watercraft is provided according to FIG. 7 and FIG. 8, which is considered to allow notification to the boat operator of the presence or non-presence of abnormality regarding the display device for a watercraft, as well as the requirement or non-requirement of the maintenance on the outboard motor 13, before the watercraft gets to the normal operating condition, thus enabling the reduction of watercraft operator's work load or mental strain in relation to the maintenance work for the watercraft.

Although this invention has been disclosed in the context of a certain preferred embodiment and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Further, by listing method steps in a particular order within a claim, no intention is made to limit the scope of the claim to that particular order. Thus, it is intended that the scope of the present invention herein disclosed should not be limited by the particular disclosed embodiments described above, but should be determined only by a fair reading of the claims that follow.

What is claimed is:

1. A display device for a watercraft to indicate various status data values regarding the conditions of an outboard motor, comprising:

a display region having a dot matrix display divided into a plurality of regions, wherein dots capable of being selectively turned on and off are arranged in the form of a matrix;

a controller configured to control the lighting pattern of the dots in the dot matrix display to illustrate a first operating parameter of the outboard motor by displaying a first status data value and a corresponding first scale and a second operating parameter of the outboard motor by displaying a second status data value and a corresponding second scale, the lighting pattern changeable to indicate a status data value corresponding to a different operating parameter of the outboard motor; and a memory configured to store a screen configuration designation chart having two or more screen configurations that can be selectively displayed on the dot matrix display, the screen configuration designation chart comprising a plurality of status data value categories displayable on the dot matrix display and information designating the region in the divided dot matrix display where status data values corresponding to a status data value category are displayed, wherein the controller is configured to select a screen configuration to be displayed on the dot matrix display from the two or more screen configurations on the screen configuration designation chart.

2. The display device for a watercraft of claim 1, wherein the plurality of regions are laid out vertically in sections, and each of the regions displays a different category of the status data values.

3. The display device for a watercraft of claim 2, wherein the number of sections formed by dividing the dot matrix display with the regions are adapted to be set-up variably.

4. The display device for a watercraft of claim 2, wherein a display form of the various status data values indicated in each of the regions is adapted to be set-up variably.

5. The display device for a watercraft of claim 4, wherein the display form is a display using numerals or characters depicted by the lighting pattern of the dots.

6. The display device of claim 2, wherein each of the plurality of regions laid out vertically in sections illustrates a scale, the scales having the same length.

7. The display device for a watercraft of claim 1, wherein an information mark display section is provided at the side of the dot matrix display, and the information mark display section displays information marks to identify the category of the various status data.

8. The display device for a watercraft of claim 7, wherein display positions of information marks indicated in the information mark display section, and display positions of the status data values corresponding to the information marks and indicated in the dot matrix display section are aligned with each other.

9. The display device for a watercraft of claim 8, wherein the display position of information marks and the display position of the status data values corresponding to the information marks are aligned adjacent each other.

10. The display device for a watercraft of claim 7, wherein the information mark display section is divided into grids arranged in the form of matrix, and a predetermined information mark is lighted freely on or off in each of the grids, allowing variable set up for lighting on or off of the information marks for each of the grids.

11. The display device for a watercraft of claim 10, wherein the information mark capable of lighting in each of the grids is a graphic for identifying the type of status data displayed in each of a plurality of regions of the dot matrix display, the regions having a rectangular configuration.

12. The display device of claim 7, wherein the memory is configured to store an information mark display designation chart having information regarding the type of information marks to be displayed in the information mark display section for each screen configuration of the screen configuration designation chart, and wherein the controller is configured to select an information mark to be displayed in the information mark display section from the plurality of the information marks stored in the memory.

13. The display device of claim 1, wherein the status data values include at least one of cooling water temperature, battery voltage and oil level.

14. The display device of claim 1, wherein the lighting pattern of the dot matrix display illustrates a scale and alphanumeric identifiers simultaneously for at least one of the operating parameters displayed.

15. The display device of claim 1, wherein the lighting pattern of the dot matrix display simultaneously illustrates the first and second status data values and the corresponding first and second scales.

16. The display device of claim 1, wherein the screen configuration designation chart is configured to store a total number of the status date values to be displayed on the dot matrix display, and wherein the CPU designates a number of sections corresponding to the total number of the status date values, the sections defined by dividing the dot matrix display into the plurality of regions.

17. The display device of claim 1, wherein the screen configuration designation chart stores information to specify a form of displaying the status data values in each of the screen configurations.

18. The display device of claim 1, wherein the form comprises a scale form and/or an alphanumeric form.

19. The display device of claim 1, wherein the screen configuration designation chart has a screen configuration number allocated to each screen configuration in the screen configuration designation chart, the memory further configured to store a selective screen designation chart that allocates a selective screen to each of the screen configuration numbers, the controller configured to switch between the selective screens to be displayed on the dot matrix display.

20. The display device of claim 1, further comprising a mode selecting switch and a set switch, the mode selecting switch actuatable to cyclically change the selective screen configuration via the controller, the set switch actuatable to cyclically change the screen configuration on the dot matrix display.

21. The display device of claim 20, further comprising an engine speed display section configured to display engine speed for the outboard motor, the controller configured to suspend the display of an engine speed status data value on the engine speed display section when the mode selecting switch and/or set switch are actuated and instead display a selective screen number corresponding to the selective screen and the screen configuration number corresponding to the screen configuration on the engine display section.

22. A display device for a watercraft to indicate various status data values regarding the conditions of a motor, comprising:

a display region having a dot matrix display including a plurality of dots, the dot matrix display divided into a plurality of regions laid out vertically in sections, the dots being arranged in the matrix and adapted to be selectively turned on and off to form a pattern, the pattern adapted to illustrate a first operating parameter of the motor by displaying a first status data value and a corresponding first scale and a second operating parameter of the motor by displaying a second status data value and a corresponding second scale, the pattern changeable from illustrating a status data value corresponding to one operating condition of the motor to illustrating a status data value corresponding to a different operating condition;

an information mark display section disposed proximal the dot matrix display and configured to display at least one information mark corresponding to the at least one status data value, the information mark identifying a category of the status data;

a memory configured to store a screen configuration designation chart having two or more screen configurations that can be selectively displayed on the dot matrix display, the screen configuration designation chart storing a plurality of status data value categories displayable on the dot matrix display and information designating the region in the divided dot matrix display where status data values corresponding to a status data value category are displayed; and means for selecting a screen configuration to be displayed on the dot matrix display from the two or more screen configurations on the screen configuration designation chart and for varying the display position of the at least one information mark indicated on the information mark display section and the display position of the at least one-status data value on the dot matrix display.

23. The display device of claim 22, wherein the dot matrix display displays a plurality of status data values, each of the regions displaying a different type of status data values.

24. The display device of claim 23, wherein the number of regions is variable.

25. The display device of claim 23, wherein a display form of the status data values indicated in each region is variable.

26. The display device of claim 22, wherein the display position of the at least one information mark and the display position of the at least one status data value corresponding to the information mark are aligned with each other.

27. The display device for a watercraft according to claim 22, wherein the information mark display section is divided into grids arranged in the form of matrix, and a predetermined information mark is lighted freely on or off in each of the grids, allowing a variable set-up for lighting on or off of the information marks for each of the grids.

28. The display device of claim 22, wherein the at least one information mark is a graphic adapted to identify the type of the at least one status data value displayed in the dot matrix display.

29. A display device for a watercraft to indicate various status data values regarding the conditions of a motor, comprising:

a display region having a dot matrix display including a plurality of dots, the dot matrix display divided into a plurality of regions laid out vertically in sections, the dots being arranged in the matrix and adapted to be selectively turned on and off to form a pattern, the pattern adapted to illustrate a first operating parameter of the motor by displaying a first status data value and a corresponding first scale and a second operating parameter of the motor by displaying a second status data value and a corresponding second scale, the pattern changeable from illustrating a status data value corresponding to one operating condition of the motor to illustrating a status data value corresponding to a different operating condition;

an information mark display section disposed proximal the dot matrix display and configured to display at least one information mark corresponding to the at least one status data value, the information mark identifying a category of the status data;

a controller configured to vary the display position of the at least one information mark indicated on the information mark display section and the display position of the at least one status data value on the dot matrix display; and a memory configured to store a screen configuration designation chart having two or more screen configurations that can be selectively displayed on the dot matrix display, the screen configuration designation chart storing a plurality of status data value categories displayable on the dot matrix display and information designating the region in the divided dot matrix display where status data values corresponding to a status data value category are displayed, wherein the controller is configured to select a screen configuration to be displayed on the dot matrix display from the two or more screen configurations on the screen configuration designation chart.

30. The display device of claim 29, wherein the at least one information mark is a graphic adapted to identify the type of the at least one status data value displayed in the dot matrix display.

31. A display device for a watercraft comprising:

a multi-display section comprising a dot matrix display section and an information mark display section, the dot matrix display section comprising dots arranged in matrix form and configured to be selectively turned on an off to illustrate one or more status data values, the information mark display section configured to display one or more information marks corresponding to the status data values to identify the category of the status data values;

a trim position display section configured to display a trim position of an outboard motor of the watercraft;

a controller configured to control the lighting pattern of the dots in the dot matrix display section to illustrate a first operating parameter of the outboard motor by displaying a first status data value and a second operating parameter of the outboard motor by displaying a second status data value, the lighting pattern changeable to indicate a status data value corresponding to a different operating parameter of the outboard motor; and a memory configured to store a screen configuration designation chart having two or more screen configurations that can be selectively displayed on the dot matrix display, the screen configuration designation chart comprising a plurality of status data value categories displayable on the dot matrix display, wherein the controller is configured to change a screen configuration to be displayed on the dot matrix display from the two or more screen configurations on the screen configuration designation chart by changing the lighting pattern of the dots in the dot matrix display section.

32. A display device for a watercraft, comprising:

a multi-display section comprising a dot matrix display section and an information mark display section, the dot matrix display section comprising dots arranged in matrix form and configured to be selectively turned on an off to illustrate one or more status data values, the information mark display section configured to display one or more information marks corresponding to the status data values to identify the category of the status data values;

a trim position display section configured to display a trim position of an outboard motor of the watercraft;

a controller configured to control the lighting pattern of the dots in the dot matrix display section to illustrate a first operating parameter of the outboard motor by displaying a first status data value and a second operating parameter of the outboard motor by displaying a second status data value, the lighting pattern changeable to indicate a status data value corresponding to a different operating parameter of the outboard motor: and a memory configured to store a screen configuration designation chart having two or more screen configurations that can be selectively displayed on the dot matrix display, the screen configuration designation chart comprising a plurality of status data value categories displayable on the dot matrix display, wherein the controller is configured to change a screen configuration to be displayed on the dot matrix display from the two or more screen configurations on the screen configuration designation chart by changing the lighting pattern of the dots in the dot matrix display section, wherein the dot matrix display section is divided into a plurality of regions laid out vertically in sections, each of the regions configured to display a different category of the status data values, the memory further configured to store information designating the region in the divided dot matrix display section where status data values corresponding to a status data value category are displayed.

* * * * *

UNITED STATES PATENT AND TRADEMARK OFFICE
CERTIFICATE OF CORRECTION

PATENT NO. : 7,571,032 B2  Page 1 of 1
APPLICATION NO. : 11/240690
DATED : August 4, 2009
INVENTOR(S) : Isao Kanno It is certified that error appears in the above-identified patent and that said Letters Patent is hereby corrected as shown below:

At column 11, line 59, please delete "watereraft", and insert --watercraft--, therefor.

At column 12, line 31, please delete "watereraft", and insert --watercraft--, therefor.

At column 13, line 18, please delete "date", and insert --data--, therefor.

At column 13, line 20, please delete "date", and insert --data--, therefor.

At column 13, line 53, please delete "engine display", and insert --engine speed display--, therefor.

At column 14, line 46, please delete "watereraft", and insert --watercraft--, therefor.

At column 15, line 23, please delete "watereraft", and insert --watercraft--, therefor.

At column 15, line 28, please delete "an", and insert --and--, therefor.

At column 16, line 13, please delete "an", and insert --and--, therefor.

At column 16, line 27, please delete "motor:", and insert --motor;--, therefor.

Signed and Sealed this

Ninth Day of February, 2010

David J. Kappos
*Director of the United States Patent and Trademark Office*